United States Patent [19]

Bellati

[11] 4,270,814

[45] Jun. 2, 1981

[54] THRUST BEARING

[75] Inventor: Hans Bellati, Wettingen, Switzerland

[73] Assignee: BBC Brown, Boveri & Co. Ltd., Baden, Switzerland

[21] Appl. No.: 70,105

[22] Filed: Aug. 27, 1979

[30] Foreign Application Priority Data

Oct. 2, 1978 [CH] Switzerland ................. 10217/78

[51] Int. Cl.³ ............................................. F16C 17/10
[52] U.S. Cl. ................................. 308/160; 308/162; 308/168
[58] Field of Search ............... 308/135, 160, 161, 162, 308/163, 168, 172, 26

[56] References Cited

U.S. PATENT DOCUMENTS

| 2,553,107 | 5/1951 | Needs | 308/168 |
| 2,978,264 | 4/1961 | Campbell | 308/135 X |
| 3,146,037 | 8/1964 | Hooker | 308/168 X |

*Primary Examiner*—Frederick R. Schmidt
*Attorney, Agent, or Firm*—Burns, Doane, Swecker & Mathis

[57] ABSTRACT

A thrust bearing for a shaft is disclosed including a shaft thrust collar arranged in steps. The stepped construction features an inside bearing surface and an outside bearing surface axially offset from the inside bearing surface. In the bearing body for each bearing surface, spring supported bearing units are provided. Each bearing unit consists of a bearing segment, a knuckle washer, and a flexible supporting bridge connected with each other by a connecting pin. Separate oil delivery and discharge passages are also provided for each bearing surface.

6 Claims, 1 Drawing Figure

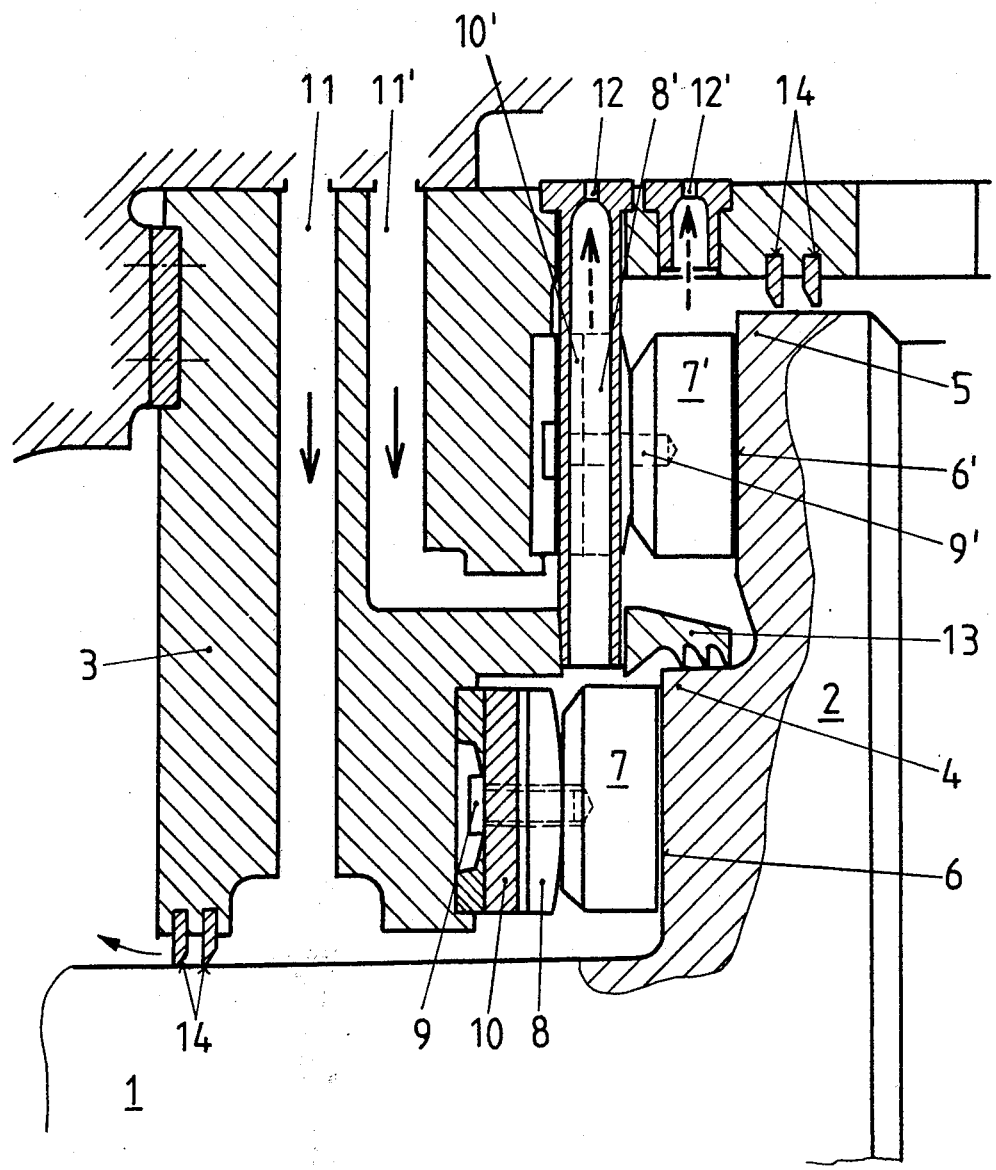

THRUST BEARING

BACKGROUND AND SUMMARY OF THE INVENTION

The present invention relates generally to thrust bearings.

In order to increase the load carrying capacity of a thrust bearing when reaching maximum permissible load of the individual segments, it is necessary in the case of a constant shaft diameter to increase the bearing surfaces of the segments. The load capacity can be increased by increasing the size of the shaft thrust collar whereby the segments can be geometrically widened.

These measures are nevertheless not advantageous in the case of relatively large bearing diameters and fast-running shafts. On the inside part of the segments, i.e., the part lying closest to the shaft, laminar lubricating flows prevail whereas, on the outside circumference, turbulent flow conditions prevail. Owing to this dissimilarity in lubricating wall conditions, the load carrying capacity of the bearing segments is continuously, unfavorably affected over the entire bearing surface such that the load capacity varies in magnitude to the inside and outside circumference of the bearing segments.

Accordingly, it is an object of the present invention to provide a thrust bearing in which a uniform load capacity on the bearing segments is achieved and in which differing flow conditions of the lubricant are avoided.

These and other objects are realized in a thrust bearing according to the present invention wherein the thrust bearing includes a shaft thrust collar arranged in steps. The stepped construction features an inside bearing surface and an outside bearing surface axially offset with respect to the inner bearing surface. Each bearing surface is provided with a spring-supported bearing unit.

Owing to the stepwise construction of the shaft collar and by reason of a distribution of the entire bearing surface over the bearing segments, the individual segments can be constructed smaller than usual without decreasing the load carrying capacity of the bearing. Therefore, more advantageous lubricating and cooling conditions are provided in the bearing since each series of segments can be provided individually with lubricant.

According to a further, more particular arrangement of the thrust bearing according to the invention, each bearing unit consists of one bearing segment, one knuckle washer and a flexible supporting bridge which are all connected to one another by a connecting pin such that the bearing segments are mobile in both the radial and the circumferential direction. Contact surfaces of the knuckle washer are constructed convexly adjacent both the bearing segment as well as the supporting bridge.

The arrangement of a knuckle washer with an elastic supporting bridge in each bearing unit enables an individual adjustment of the flexibility of each supporting bridge. Thereby the axial play between the shaft thrust collar and the individual bearing segments may be individually adjusted. Hence, the inside and outside bearing segment series can be adjusted with respect to each other and allow the bearing to be optimally adapted to operating conditions. The knuckle washer acts simultaneously as a compensation device and a universal coupling between the fleixble supporting bridge and the bearing segment. By this arrangement, each segment of the bearing can be independently adapted to changes on the bearing surfaces.

Further, it is advantageous to provide a separate set of oil delivery and discharge lines disposed in the bearing body for the inside and outside bearing surfaces with a seal provided between the two bearing surfaces. The oil delivery and discharge lines are preferably to be uniformly distributed over the entire bearing circumference.

By the arrangement of separate oil delivery and discharge lines for each bearing surface, it is possible for each segment series to be supplied individually with lubricant. Advantageously, the lubricant pressure in the outside bearing component is set higher than the pressure in the inside bearing component to prevent heated oil from passing over into the outside segment space from the inside segment space by centrifugal force and thereby reduce the load carrying capacity of the outside bearing segments.

BRIEF DESCRIPTION OF THE DRAWING

A preferred embodiment of a thrust bearing according to the present invention will be described with reference to the single accompanying FIGURE of a cross-sectional view of a thrust bearing according to the present invention.

DETAILED DESCRIPTION OF THE PREFERRED EMBODIMENT

With reference to the single drawing FIGURE, a preferred embodiment of a thrust bearing according to the present invention includes a shaft 1 and a shaft thrust collar 2 on which is arranged a bearing body 3 of the thrust bearing. The shaft thrust collar 2 features two steps in an axial direction and specifically, an inside step 4, and an outside step 5. On each of the two steps 4, 5, a respective bearing segment 7, 7' slides on a corresponding bearing surface 6, 6'. The bearing segments 7, 7' are uniformly distributed over the entire bearing circumference.

Each one of the bearing segments 7, 7' features a plane surface on the side turned away from the bearing surface. Knuckle washers 8, 8', with convex surfaces, are located adjacent to each bearing segment 7, 7'. The knuckle washers 8, 8' consist of an annular-cylindrical washer having two cylindrical sections arranged within the annular-cylindrical washer. The axes of the cylindrical sections are offset by 90° with respect to each other in parallel planes. In the drawing figure the axes of the cylindrical sections adjacent the bearing segments 7, 7' are perpendicular to the page while the axes of the cylindrical sections adjacent the supporting bridges 10, 10' are parallel with the page.

The washers 8, 8' are connected by a respective connecting pin 9, 9' with the corresponding bearing segments 7, 7'. The washers are further connected by the pins 9, 9' with corresponding flexible supporting bridges 10, 10' such that compensation for changes on the bearing surfaces of the bearing segments 7, 7' can be accomplished.

Oil delivery lines 11, 11' and oil discharge lines 12, 12' are provided in the bearing body 3 for each bearing segment series. The lines 11, 11' and 12, 12' transport lubricant independently to and from the inner bearing segment series and the outer bearing segment series. The oil delivery lines 11, 11' and the oil discharge lines 12, 12' (for the outside and inside bearings) are maintained separate from one another by a seal 13 arranged between the inside step 4 and the outside step 5 of the shaft thrust collar. Labyrinth glands 14 are arranged between the bearing body 3 and the shaft 1 as well as between the bearing body 3 and the shaft thrust collar 2.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A thrust bearing in combination with a rotating shaft comprising:
   a bearing body;
   a thrust collar on the shaft arranged in steps with radially inside and outside bearing surfaces offset axially with respect to one another; and
   a plurality of bearing segments distributed over the circumference of the inside bearing surface and a plurality of bearing segments distributed over the outside bearing surface, with each bearing segment being disposed between the thrust collar and the bearing body; and
   means flexibly mounting each of said bearing segments on said bearing body.

2. A thrust bearing according to claim 1 wherein said means for flexibly mounting said bearing segments includes for each bearing segment:
   a flexible supporting bridge;
   a knuckle washer having first and second contact surfaces adjacent the bearing segment and the supporting bridge respectively, said contact surfaces being shaped to act as a universal coupling between said bridge and said bearing segment; and
   a pin connecting the bearing segment, the knuckle washer, and the supporting bridge together such that the bearing segment is mobile in the radial and circumferential directions.

3. A thrust bearing according to claim 2 wherein both the first and the second contact surfaces of the knuckle washer adjacent the bearing segment and the supporting bridge respectively are convex.

4. A thrust bearing according to claim 1, 2 or 3 further comprising:
   first means for lubricating the inside bearing surface with oil; and
   second means for lubricating the outside bearing surface with oil, wherein the first and second means are separated from one another, and wherein the first and second means are separated by a seal.

5. A thrust bearing according to claim 4 wherein the first and second means each include a plurality of oil supply and oil drainage lines provided in the bearing body and distributed about the circumference of the bearing body.

6. A thrust bearing according to claim 1 further comprising:
   a first labyrinth gland arranged between the bearing body and the shaft; and
   a second labyrinth gland arranged between the bearing body and the thrust collar.

* * * * *